(12) United States Patent
Nicolai et al.

(10) Patent No.: US 7,480,415 B2
(45) Date of Patent: Jan. 20, 2009

(54) FRACTAL-CODING ADDRESSING OF REFERENCE BLOCK MEMORIES

(75) Inventors: Jean Nicolai, Chateauneuf le Rouge (FR); Marie Rimpault, Orsay (FR)

(73) Assignee: STMicroelectronics S.A., Montrouge (FR)

( * ) Notice: Subject to any disclaimer, the term of this patent is extended or adjusted under 35 U.S.C. 154(b) by 506 days.

(21) Appl. No.: 10/500,397

(22) PCT Filed: Dec. 27, 2002

(86) PCT No.: PCT/FR02/04579

§ 371 (c)(1),
(2), (4) Date: Apr. 28, 2005

(87) PCT Pub. No.: WO03/056519

PCT Pub. Date: Jul. 10, 2003

(65) Prior Publication Data

US 2005/0226519 A1 Oct. 13, 2005

(30) Foreign Application Priority Data

Dec. 28, 2001 (FR) .................................. 01 17035

(51) Int. Cl.
*G06K 9/36* (2006.01)
*G06K 9/46* (2006.01)
*G06K 9/54* (2006.01)
*G06T 9/00* (2006.01)

(52) U.S. Cl. ...................... 382/232; 345/555; 382/305; 375/240.24

(58) Field of Classification Search ......... 382/232–253, 382/302–305; 345/555–565; 375/240.25
See application file for complete search history.

(56) References Cited

U.S. PATENT DOCUMENTS

| | | | | |
|---|---|---|---|---|
| 4,694,407 A | * | 9/1987 | Ogden | 382/278 |
| 4,941,193 A | * | 7/1990 | Barnsley et al. | 382/249 |
| 5,347,600 A | * | 9/1994 | Barnsley et al. | 382/249 |
| 5,768,437 A | * | 6/1998 | Monro et al. | 382/249 |
| 6,501,862 B1 | * | 12/2002 | Fukuhara et al. | 382/249 |
| 6,714,451 B2 | * | 3/2004 | Ooishi et al. | 365/185.09 |

OTHER PUBLICATIONS

Fatemi, O.; Panchanathan, S.P., "Fractal engine: an affine video processor core for multimedia applications," Circuits and Systems for Video Technology, IEEE Transactions on, vol. 8, No. 7, pp. 892-908, Nov. 1998.*
Bhunia, S.K.; Ghosh, S.K.; Kumar, P.; Das, P.P.; Mukherjee, J., "Design, simulation and synthesis of an ASIC for fractal image coding," VLSI Design, 1999. Proceedings. Twelfth International Conference On, vol., No., pp. 544-547, Jan. 7-10, 1999.*
Ancarani, F., et al., "Design of an ASIC Architecture for High Speed Fractal Image Compression," Ninth Annual IEEE International ASIC Conference and Exhibit, pp. 223-226, Sep. 23-27, 1996.

* cited by examiner

*Primary Examiner*—Bhavesh M Mehta
*Assistant Examiner*—Manav Seth
(74) *Attorney, Agent, or Firm*—Lisa K. Jorgenson; Dennis M. de Guzman; Seed IP Law Group PLLC

(57) ABSTRACT

The storage of values of a range block and of seven isometries used in a fractal image compression method, comprising using four memory areas of identical sizes in which are respectively stored the identity, and three first isometries corresponding to the isometries of symmetry with respect to the vertical axis, of 270° rotation, and of 90° rotation.

10 Claims, 4 Drawing Sheets

FRACTAL-CODING ADDRESSING OF REFERENCE BLOCK MEMORIES

BACKGROUND OF THE INVENTION

1. Field of the Invention

The present invention relates to digital image processing and more specifically the compression of digital images by fractal coding.

2. Description of the Related Art

Fractal coding comprises searching, in a digital image, similar image portions to reduce the image volume by only, for the blocks considered as similar, coding a single block and identifying the other similar blocks by a reference to the first block.

FIG. 1 illustrates in a simplified view a digital image I in which a search window SW must be coded by fractal compression. The window is divided into blocks of same dimension, here B1, B2, ..., B5, ..., B9 of 32 by 32 pixels, search window SW being of 34 by 34 pixels. Blocks B1 to B9 overlap or cover one another in both directions. In practice, a search window of greater dimension is used, for example, 64 by 64 pixels. To simplify, an embodiment of the present invention will be described in relation with an example of a search window of 34 by 34 pixels. It however applies whatever the number of pixels of the search window and of the blocks.

The search for the similar blocks is performed with respect to a reference block also called range block RB of dimensions smaller than those of blocks B1 to B9. To enable comparison, blocks B1 to B9 are sub-sampled to obtain so-called domain blocks DB of same size as range block RB.

FIG. 2 illustrates this sub-sampling by a transformation of blocks Bi into domain blocks DBi. Each domain block contains values corresponding to the average pixel group values of the corresponding entire block.

The similarities between blocks RB and DB are not searched for identities only. It is also searched whether each domain block corresponds to the range block after given transformations. These transformations are called isometries and respectively correspond to a symmetry with respect to the vertical axis, a symmetry with respect to the horizontal axis, a 180° rotation, a symmetry of axis Y=X, a 270° rotation, a 90° rotation, and a symmetry of axis Y=−X.

The fractal image coding or compression technique is described, for example, in work "Fractal image compression: Theory and application to digital images" by Yuval Fisher, published by Springer Verlag, New-York, 1995. Another example of a fractal image compression algorithm is described in article "Design of an ASIC architecture for high speed fractal image compression" by Ancarani De Gloria and Olivieri Stazzone, published in IEEE "International ASIC conference", September 1996.

Those skilled in the art can also refer to French patent application 2,775,812.

To enable comparing domain blocks with the range block, the range block and its seven isometries must conventionally be stored in distinct memory areas.

BRIEF SUMMARY OF THE INVENTION

One embodiment of the present invention aims at reducing the necessary memory space in a digital image fractal coding system.

One embodiment of the present invention more specifically aims at reducing the storage space necessary to the range block isometries.

An embodiment of the present invention provides a method for storing values of a range block and of seven isometries used in a fractal image compression method, comprising using four memory areas of identical sizes in which are respectively stored the identity, and three first isometries corresponding to the isometries of symmetry with respect to the vertical axis, of 270° rotation, and of 90° rotation.

An embodiment of the present invention also provides a method for reading from memory areas in which each memory area is addressed in a first direction for the reading of the stored values to obtain the identity and the first three isometries, and in the reverse direction for the reading of the four other isometries of symmetry with respect to the horizontal axis, of 180° rotation, of symmetry with respect to a first diagonal, and of symmetry with respect to the second diagonal.

An embodiment of the present invention also provides a fractal image compression method using a range block and seven isometries of this block, including:

memorizing the respective values of the pixels of the range block and of only three of its isometries; and addressing the corresponding memory areas in read mode in one direction or in the reverse direction according to the desired isometry.

According to an embodiment of the present invention, two isometries of the range block are stored in a same memory area.

One embodiment of the present invention also provides a circuit for addressing a memory of storage of an image data range block intended to be used in a fractal image compression method, including means for addressing each of four areas of said memory in a first direction and in the reverse direction.

The foregoing features of the present invention will be discussed in detail in the following non-limiting description of specific embodiments in connection with the accompanying drawings.

DETAILED DESCRIPTION OF THE INVENTION

Figure 1:
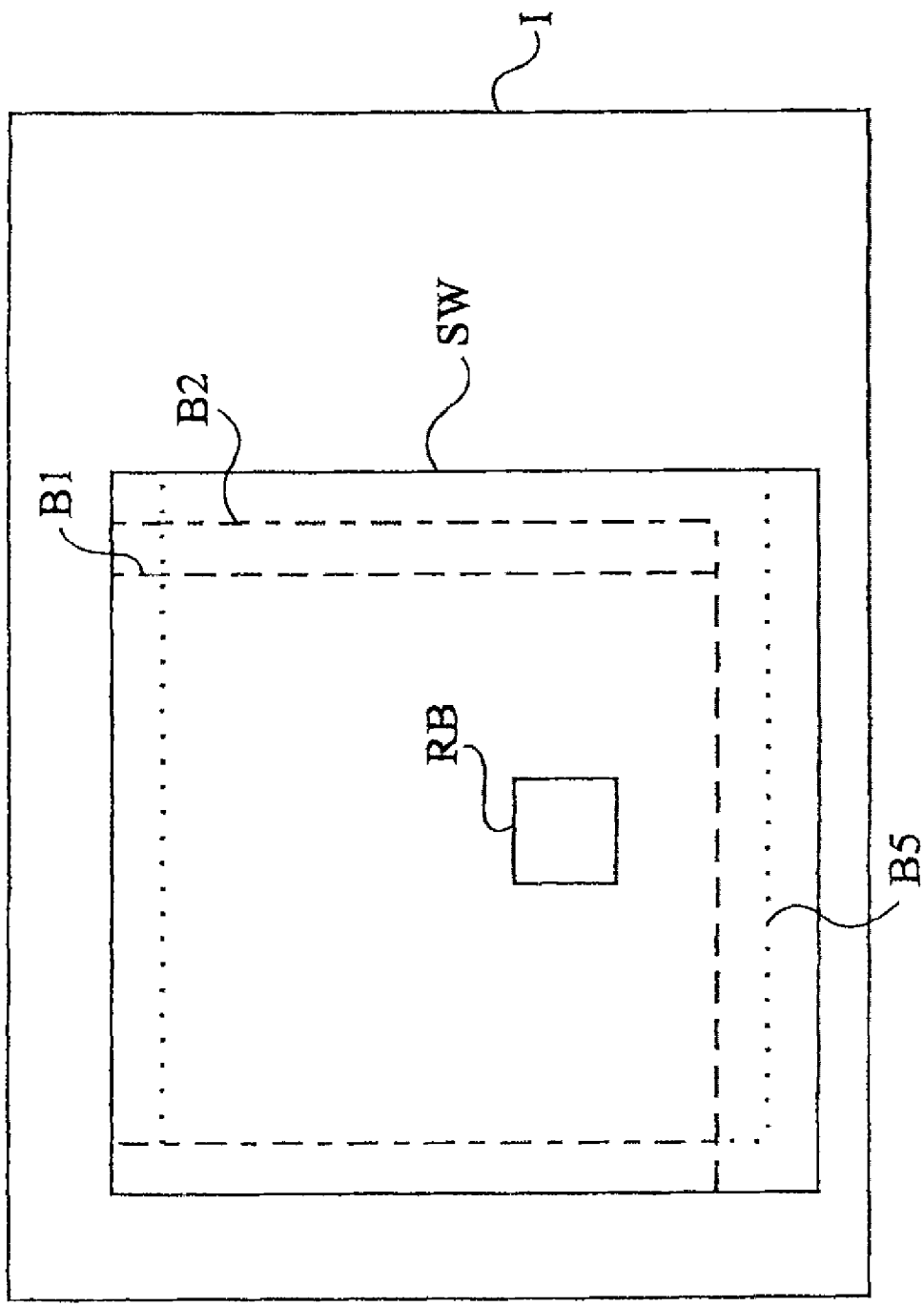
FIGS. 1 and 2, previously described, illustrate the fractal image compression to which an embodiment of the present invention applies.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Same elements have been designated with same references in the different drawings. For clarity, only those elements and those method operations which are necessary to the understanding of the present invention have been shown in the drawings and will be described hereafter. In particular, the different calculations and processings upstream and downstream of the storages and of the reading of the range blocks have not been detailed and are no object of the present invention. Further, the sequencing of the processings of loading and unloading of the range blocks depends on the application and is no object of the present invention either.

Figure 2:
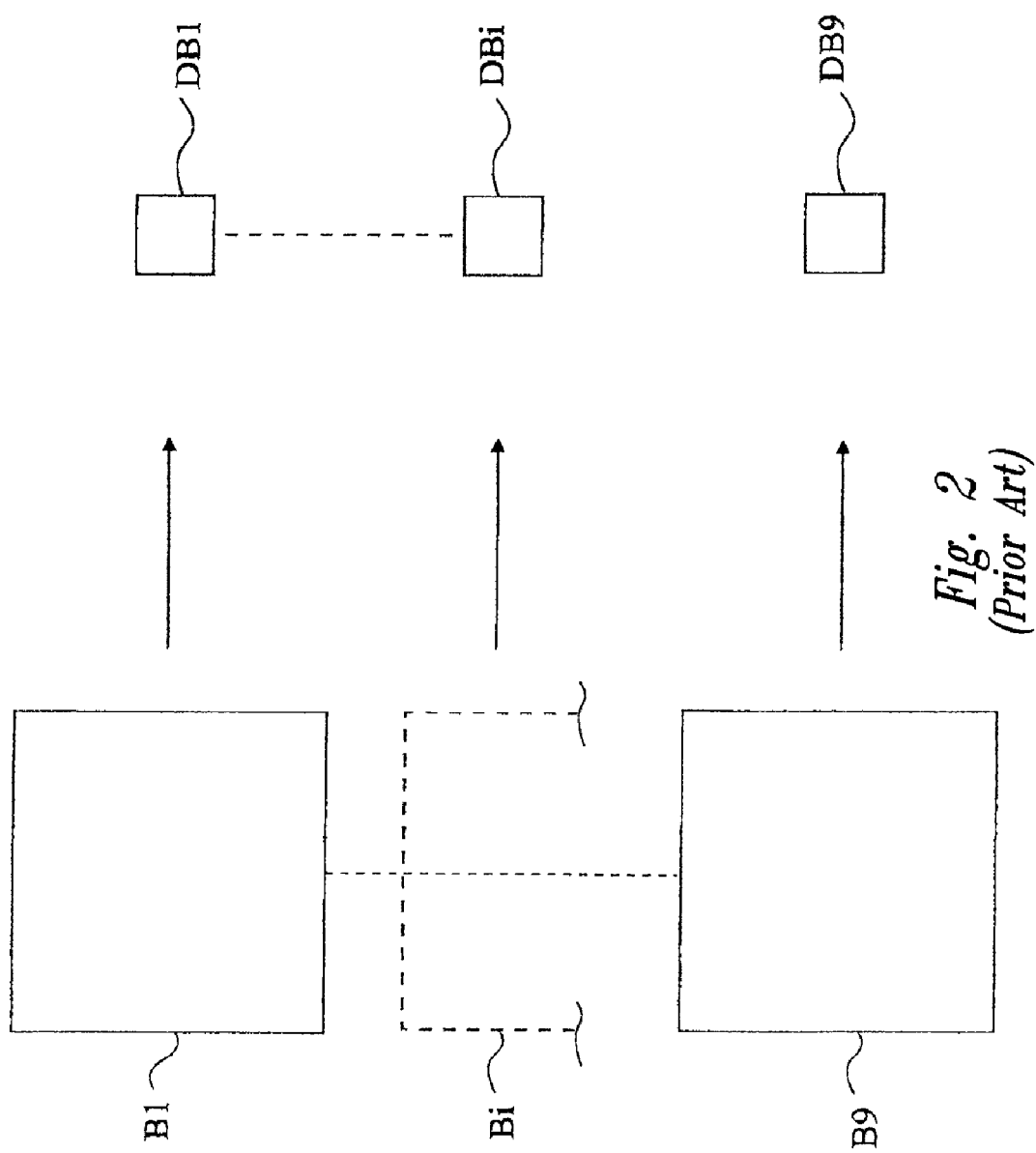
Figure 3:
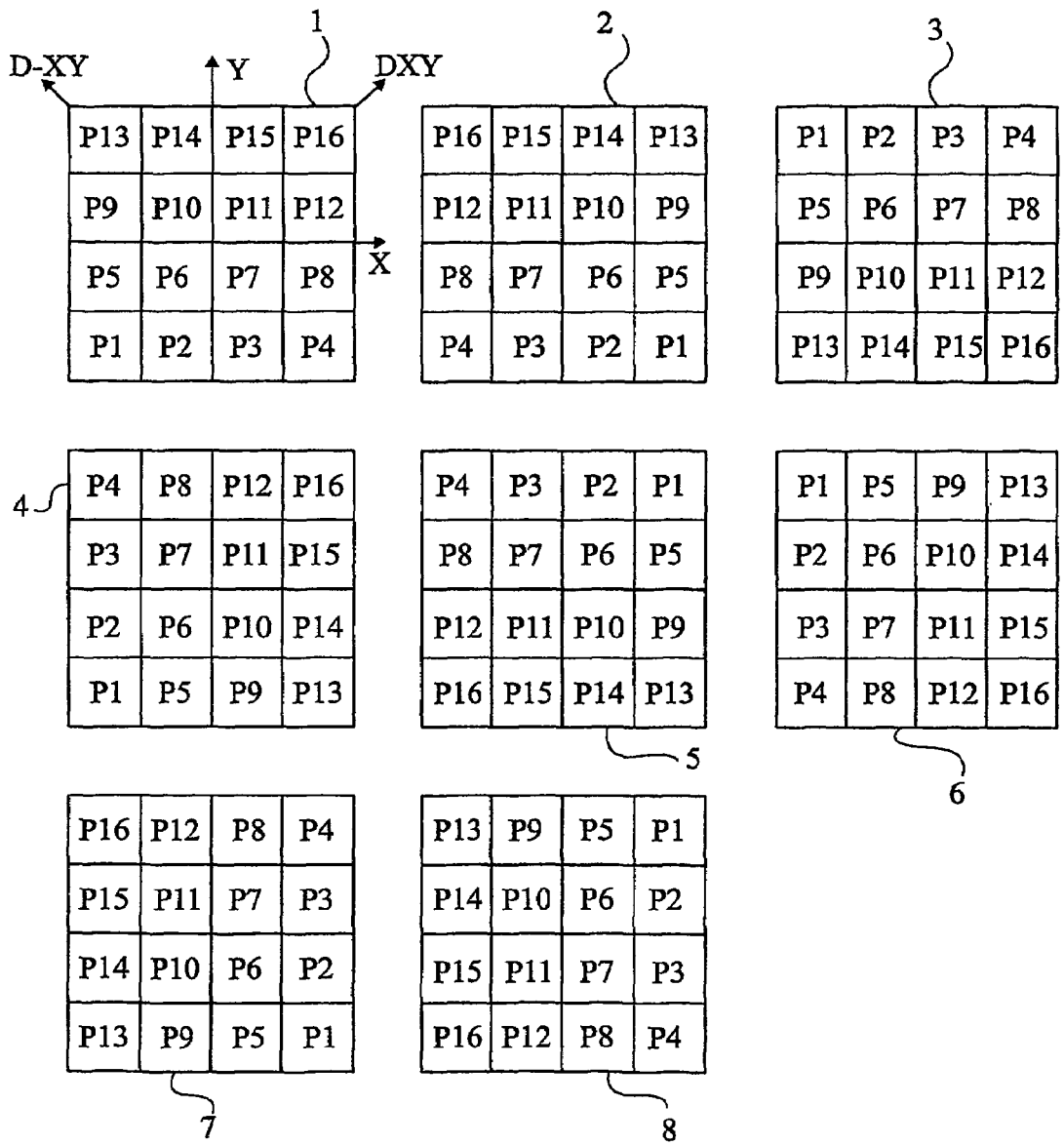
FIG. 3 illustrates the different isometries of a range block of a digital image in fractal coding according to an example of four by four pixels.

FIG. 3 very schematically shows the seven possible isometries in a fractal image coding for a range block 1 of four by four pixels. The choice of the number of 16 pixels for the range block is arbitrary. The present invention applies whatever the number of pixels of the range blocks, provided that the blocks are square. In particular, most often, these blocks are blocks of eight by eight pixels, their size depending on the size of the obtained sub-sampled blocks (DBi, FIG. 2).

Reference block 1 is taken arbitrarily as the identity block, that is, in the case where pixels P1 to P16 of range block 1 correspond in values and arrangements to the pixels of the domain block being compared. In FIG. 3, the pixels of the range block have been numbered as P1 to P16 and arranged line by line from left to right from the bottom of the block in the position of the drawing.

A first isometry 2 corresponds to a symmetry with respect to vertical axis Y centered in the middle of the range block. If a domain block corresponds to the arrangement shown in isometry 2 of FIG. 3, it will be considered that it is possible to transmit it in the form of the number of range block 1, associated with the parameter defining the isometry of vertical axis.

A second isometry 3 corresponds to a symmetry with respect to horizontal axis X centered in the middle of the reference image.

A third isometry 4 corresponds to a symmetry of axis Y=X. This amounts to a symmetry with respect to diagonal $D_{XY}$.

A fourth isometry 5 corresponds to a 180° rotation of the range block.

A fifth isometry 6 corresponds to a 270° rotation.

A sixth isometry 7 corresponds to a 90° rotation.

A seventh isometry 8 corresponds to a symmetry of axis Y=−X, that is, a reflection with respect to diagonal $D_{-XY}$.

A feature of an embodiment of the present invention is to only use four memory areas having a size corresponding to the size of the range block to store all the isometries necessary to the comparison.

Another feature of an embodiment of the present invention is to provide a reading of the isometries in reverse directions so that each memory area actually contains two isometries of the range block.

Figure 4:
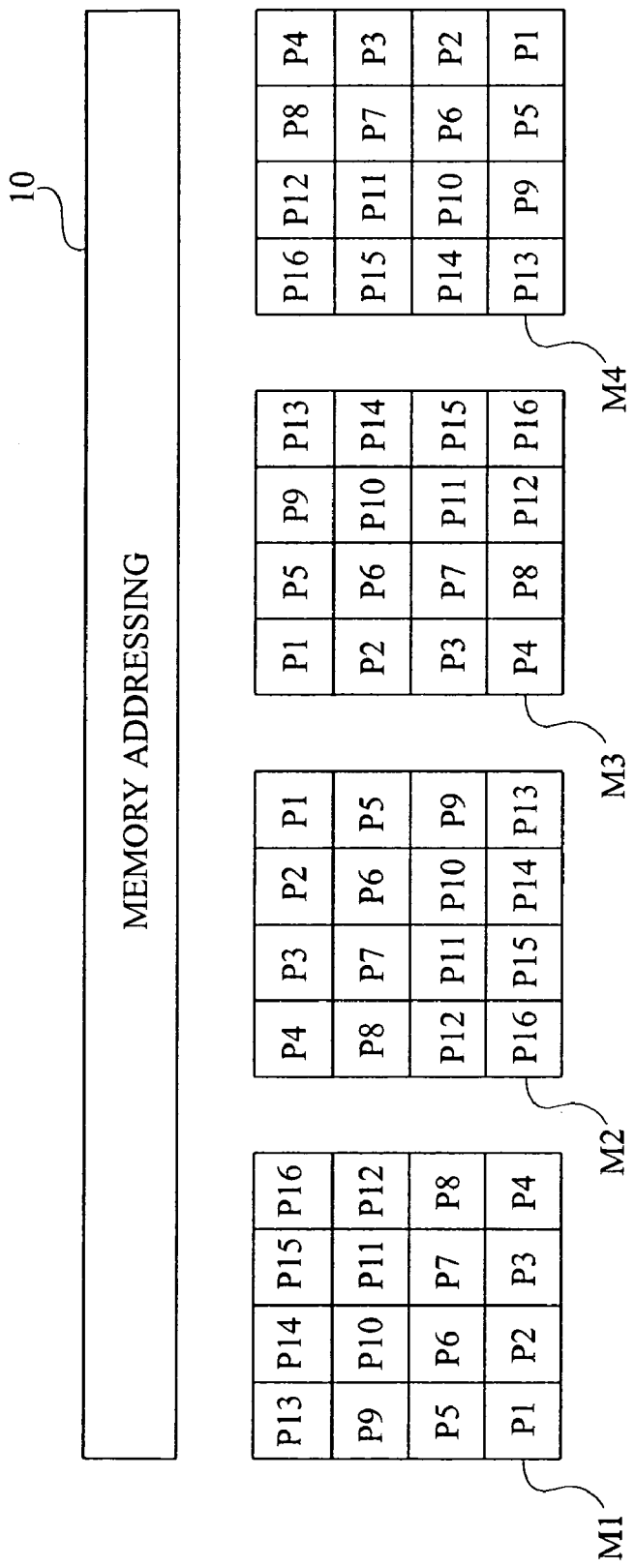
FIG. 4 shows the architecture of a memory according to an embodiment of the present invention intended for the coding of the reference isometries in a fractal coding method.

FIG. 4 illustrates, in a simplified view to be compared to that of FIG. 3, four memory areas M1, M2, M3, and M4 storing range block 1 shown in FIG. 3 and its isometries.

According to an embodiment of the present invention, a first memory area M1 contains arrangements 1 and 3, that is, the identity and the symmetry with respect to the horizontal axis.

A second memory area M2 contains isometries 2 and 4, that is, the symmetry with respect to the vertical axis and the 180° rotation.

A third memory area M3 contains isometries 5 and 6, that is, the symmetry of axis Y=X and the 270° rotation.

A fourth memory area M4 contains isometries 7 and 8, that is, the 90° rotation and the symmetry of axis Y=−X.

As appears from FIG. 4, to obtain the different isometries, it is enough to organize the reading from the corresponding memory area, once from top to bottom, then, from bottom to top.

Such a reading is easily implementable by means of a memory addressing circuit 10, parameterized according to the type of isometry with which the current domain block is desired to be compared.

An advantage of the present invention is that it divides by two the memory space necessary for the storage of the range blocks and of their respective isometries.

Another advantage of the present invention is that it results in no complexity of the memory selectors. The only counterpart is a read-adapted programming of memory areas M1 to M4 containing the range block isometries.

Of course, the present invention is likely to have various alterations, modifications, and improvements which will readily occur to those skilled in the art. In particular, although an embodiment of the present invention has been described in reference to isometries of range blocks of 4×4 pixels, it applies to any square range block and its isometries.

Further, the present invention more generally applies to any image processing method requiring storage of image block isometries, similar to those used in a fractal compression.

Moreover, the practical implementation of the circuits necessary to the implementation of the present invention and the control signals of addressing of the different memory areas are within the abilities of those skilled in the art based on the function indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method for storing values of a range block and of seven isometries used in a fractal image compression method, comprising using only four memory areas of identical sizes in which are respectively stored an identity, and three first isometrics corresponding to isometries of symmetry with respect to a vertical axis, a 270° rotation, and a 90° rotation.

2. The method of claim 1, further comprising reading from the memory areas, wherein each memory area is addressed in a first direction for a reading of stored values to obtain the identity and the first three isometries, and in a reverse direction for a reading of four other isometries of symmetry with respect to a horizontal axis, a 180° rotation, a first diagonal, and a second diagonal.

3. A method, comprising:
   obtaining a reference block of pixels from an image;
   performing transformation on the reference block to obtain a plurality of isometrics corresponding to isometries of symmetry with respect to at least one axis and with respect to at least one rotation of the reference block; and
   storing values representative of the reference block and values representative of the isometries, said storing including respectively storing said values representative of the reference block and said values, which are representative of three of the isometries, in only four memory areas.

4. The method of claim 3 wherein storing the values representative of the reference block and of the isometries includes storing these values in memory areas of identical sizes.

5. The method of claim 3 wherein performing transformation on the reference block to obtain the plurality of isometries includes obtaining the isometrics of symmetry with respect to a vertical axis, a 270° rotation, and a 90° rotation.

6. The method of claim 5 wherein performing transformation on the reference block to obtain the plurality of isometries further includes obtaining the isometrics of symmetry with respect to a horizontal axis, a 180° rotation, a first diagonal, and a second diagonal.

7. The method of claim 6, further comprising:
reading a memory area, in a first direction, having stored therein the values representative of the reference block and values representative of the isometries of symmetry with respect to the vertical axis, the 270° rotation, and the 90° rotation; and
reading the memory area, in a second direction different from the first direction, having stored therein the values representative of the isometries of symmetry with respect to the horizontal axis, the 180° rotation, the first diagonal, and the second diagonal.

8. The method of claim 7 wherein reading the memory area in the second direction includes reading the memory area in a reverse direction relative to the first direction.

9. The method of claim 1 wherein said using four memory areas includes storing at least two of the isometries in a same memory area.

10. The method of claim 1, further comprising reading particular ones of the memory areas, having values stored therein, in a forward direction or in a reverse direction according to an isometry that is to be compared with a domain block of pixels of the image.

* * * * *

UNITED STATES PATENT AND TRADEMARK OFFICE
CERTIFICATE OF CORRECTION

PATENT NO. : 7,480,415 B2
APPLICATION NO. : 10/500397
DATED : January 20, 2009
INVENTOR(S) : Jean Nicolai et al.

It is certified that error appears in the above-identified patent and that said Letters Patent is hereby corrected as shown below:

<u>Column 4</u>
Line 40, "isometrics used in a fractal image compression method," should read as
-- isometries used in a fractal image compression method, --

Lines 42-43, "isometrics corresponding to isometrics of symmetry with" should read as
-- isometries corresponding to isometries of symmetry with --

Line 49, "for a reading of four other isometrics of symmetry with" should read as -- for a reading of four other isometries of symmetry with --

Line 55, "a plurality of isometrics corresponding to isometrics of" should read as -- a plurality of isometries corresponding to isometries of --

Line 65, "representative of the reference block and of the isometrics" should read as
-- representative of the reference block and of the isometries --

<u>Column 5</u>
Line 3, "includes obtaining the isometrics of symmetry with" should read as -- includes obtaining the isometries of symmetry with --

Line 7, "further includes obtaining the isometrics of symmetry" should read as -- further includes obtaining the isometries of symmetry --

Line 13, "and values representative of the isometrics of symmetry" should read as -- and values representative of the isometries of symmetry --

Signed and Sealed this

Second Day of June, 2009

JOHN DOLL
*Acting Director of the United States Patent and Trademark Office*